United States Patent [19]
Beneteau et al.

[11] Patent Number: 4,776,057
[45] Date of Patent: Oct. 11, 1988

[54] WIPER SYSTEM FOR MOTOR VEHICLES

[75] Inventors: Christian Beneteau, Gorcy, France; André Leroy, Mons; Jean M. Flamme, Beloeil, both of Belgium

[73] Assignee: Champion Spark Plug Europe S.A., Binche, Belgium

[21] Appl. No.: 57,369

[22] Filed: Jun. 2, 1987

[30] Foreign Application Priority Data

Jun. 3, 1986 [FR] France .................. 86 07962

[51] Int. Cl.⁴ .............................................. B60S 1/02
[52] U.S. Cl. .............................. 15/250.21; 15/250.31
[58] Field of Search .......... 15/250.21, 250.23, 250.31, 15/250.34, 250.35

[56] References Cited

U.S. PATENT DOCUMENTS 3,428,995 2/1969 Pollock ..................... 15/250.23
4,683,605 8/1987 Leroy et al. ............... 15/250.21

FOREIGN PATENT DOCUMENTS 1816835 1/1973 Fed. Rep. of Germany ... 15/250.31

Primary Examiner—Peter Feldman
Attorney, Agent, or Firm—Wood, Dalton, Phillips, Mason & Rowe

[57] ABSTRACT

The invention relates to a wiper system for motor vehicles or the like, comprising at least one wiper arm guided and actuated in a complex movement by a kinematic chain or mechanical linkage which comprises a first bar (2) actuated in an oscillating movement by a motor (63), a second bar (3) pivotally connected (23) to the first bar (2) and rigidly attached to the wiper arm, a third bar (4) articulated (34) to the second bar (3) and a fourth bar (5) secured to the vehicle body at one of its ends and torically connected to the third bar (4) at the other of its ends, said toric connection being materialized by a joint (45) made of an elastomer material. The kinematic chain and wiper arm are driven by a second kinematic chain or mechanical linkage which comprises a motor (63), a crank (64) and bar (65) with the bar (65) being pivotally connected to bar (62) rigidly connected to pivot shaft (61) connected to first bar (2). In its rest position said joint can, for example, have the form of an element of revolution provided with a torically shaped recess.

7 Claims, 3 Drawing Sheets

WIPER SYSTEM FOR MOTOR VEHICLES

BACKGROUND OF THE INVENTION

1. Field of the Invention

The present invention relates to a wiper system for motor vehicles or the like, comprising at least one wiper arm guided and actuated in a complex movement by a kinematic chain or mechanical linkage.

2. Background Art

Wiper systems of the thus defined type are known in prior art and are for example disclosed in French patent application No. 2,563,788 and in Belgian Pat. Nos. 901,052 and 903,681. In said application/patents there are disclosed wiper systems which guide and actuate a wiper arm in a complex movement by connecting it to a bar of a kinematic chain or mechanical linkage comprising exclusively pivot and prismatic articulations or pivot and spherical articulations.

The main disadvantages of these prior art wiper systems are:

(a) it is very difficult, and therefore relatively expensive to protect the prismatic and the spherical articluations against dirt and against dirty waters; and (b) because of the bad distribution of the forces acting on the different bars of the kinematic chain the attachment of said bars to the vehicle body must be very strong and thus relatively expensive.

SUMMARY OF THE INVENTION

The above drawbacks of the prior art wiper systems are eliminated in the wiper system according to the invention which, moreover, has the advantage that it absorbs the shocks which may result from the reversal of the direction of the forces which occur in the kinematic chain when the wiper arm is working.

The object of the invention is thus to provide a wiper system, of the above defined type, which ensures a smooth movement of the wiper arm and which is less expensive than similar prior art wiper systems.

The wiper system according to the invention comprises a first kinematic chain of one degree of liberty. Said first kinematic chain comprises a fixed element and a first bar pivotally connected to the fixed element and actuated in an oscillating movement by a motor and by a second kinematic chain. It also comprises a second bar pivotally connected to the first bar and rigidly connected to the wiper arm.

The wiper system according to the invention is substantially characterized by the fact that the first kinematic chain further comprises a third bar articulated to the second bar and a fourth bar rigidly attached to the fixed element at one of its ends and connected to the third bar by means of a toric connection at the other of its ends, said toric connection being materialized by a joint.

It is to be noted that the fixed element of the first kinematic chain may be materialized by the vehicle body and that the third or the fourth bar of said kinematic chain may be elbow shaped.

Another feature of the wiper system according to the invention is the fact that the articulation between the second bar and the third bar could be a combination of a pivot connection and a toric connection, said two connections being materialized separately in such a way that the liberty given by the pivot connection is obtained by a sliding movement and that the liberties given by the toric connection are obtained by deformation.

A further possibility would be that the articulation between the second and the third bar is only a pivot connection. In this case the movement of the first kinematic chain must be a plane movement, i.e., the geometrical axes of all the pivot connections of the chain must be parallel to each other.

In the present description and in the claims of the wiper system according to the invention the terms "pivot connection", "prismatic connection", "toric connection", "spherical connection" and "joint" are defined as follows:

a pivot connection is a connection between two elements permitting a relative rotary movement about one axis, i.e. rotational movement about a single axis;

a prismatic connection is a movement or articulation along a single axis in a sliding movement;

a toric connection is a connection between two elements permitting, with respect to one of the elements, any orientation of an axis of the other element, said axis passing through a fixed point which is an integral part of both elements;

a spherical connection is a movement or articulation about three axes; and a joint is an element or an assembly of several elements materializing a toric connection between two other elements.

In practice a single element joint can only be made of an elastomer material. In its rest position the single element joint can have for example the form of (a) an element of revolution provided with a torically shaped recess, (b) a prismatic element of which the transverse section is locally reduced and (c) an elbow shaped element of which the transverse section is locally reduced. The elbow shape avoids any permanent constraint in the joint if the bars to which it is connected are not in alignment in their rest position.

The combination of the elastomer material and of one of the above mentioned forms of the joint permits the localization and the amplification of the bending deformations and at the same it limits the deformations due to tension, compression and torsion forces.

The combination of the elastomer material and of said different forms of the joint also ensures the damping of the shocks which can appear when the direction of the oscillating movement of the first bar is inversed. It is to be noted that the damping of the shocks can be reinforced by any complementary device known in prior art and integrated into the third bar, in particular in the area between the two connections which link said third bar to the second bar at one of its ends and to the fourth bar at the other of its ends.

BRIEF DESCRIPTION OF THE DRAWINGS

The wiper system according to the invention will be better understood when reading the following portions of the dscription in conjunction with the appended drawings, wherein.

BRIEF DESCRIPTION OF THE PREFERRED EMBODIMENTS

Figure 1:
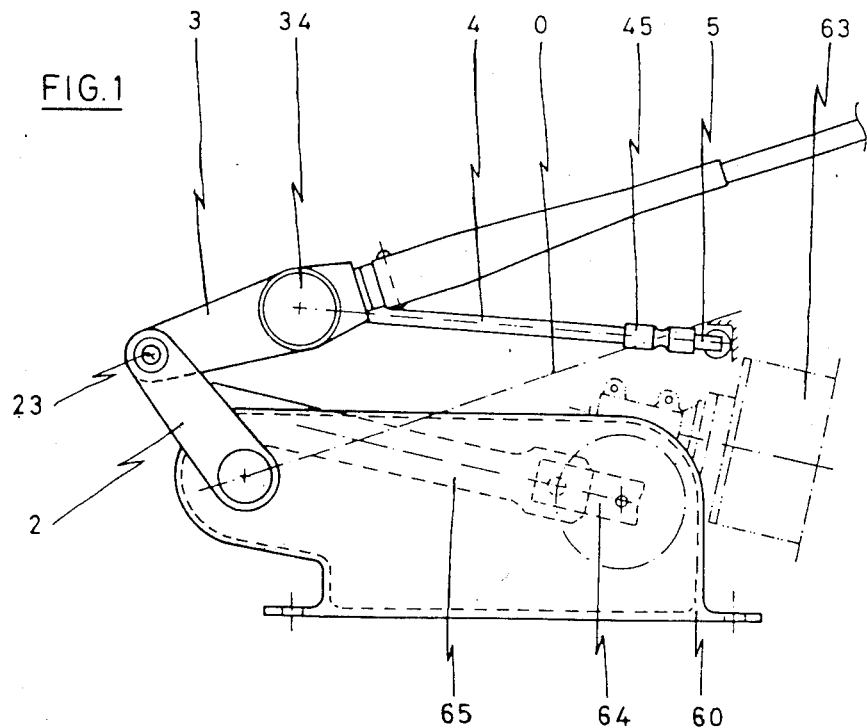
FIG. 1 is a schematic top view of the wiper system according to the invention.
Figure 2:
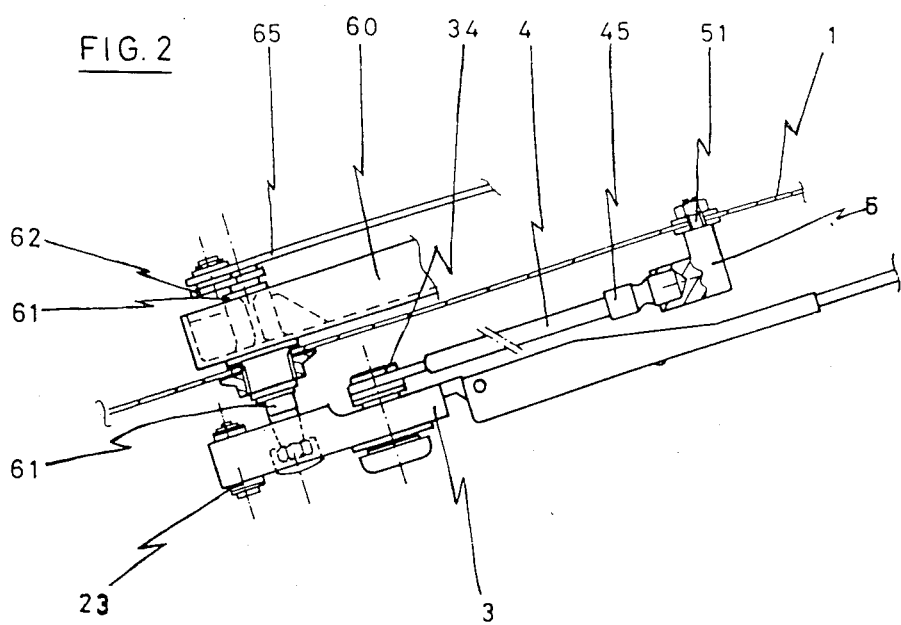
FIG. 2 is a schematic elevational view of the wiper system of FIG. 1.

In FIG. 1 and FIG. 2 it can be seen that the first kinematic chain comprises the following elements: (a) the fixed element 1 (FIG. 2) materialized by the vehicle body and represented in FIG. 1 by the line 0, (b) the first bar 2 which is rigidly attached to the drive shaft 61, said drive shaft 61 being pivotally connected to the vehicle body 1, (c) the second bar 3 which is pivotally connected to the first bar 2, (d) the third bar 4 which is articulated (34) to the second bar 3 and (e) the fourth bar 5 which is rigidly attached (51) to the vehicle body 1 and which is torically connected to the third bar 4 by means of the elastomer joint 45.

FIG. 1 and FIG. 2 also show the motor frame 60 located underneath the vehicle body 1 and the bar 62 rigidly connected to the drive shaft 61. The bar 62 is part of the second kinematic chain which imparts an oscillating movement to the first bar 2 (of the first kinematic chain) by means of the motor 63, the crank 64 and the bar 65.

As known in similar prior art wiper systems, when the motor 63 actuates the second kinematic chain, and consequently also the first kinematic chain, it imparts not only an oscillating movement, but also a superimposed radial movement to the wiper arm of the system.

Figure 3:
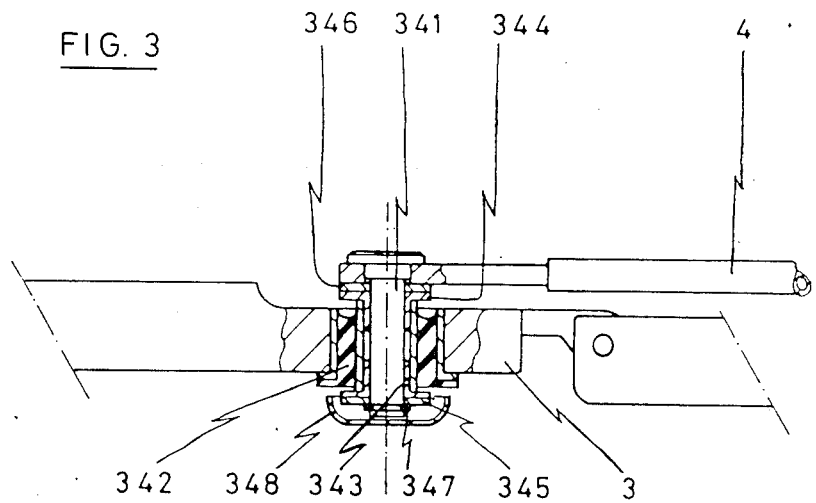
FIG. 3 is an elevational/sectional view, on a larger scale, of a first embodiment of the articulation between the second and the third bar of the wiper system according to the invention.

FIG. 3 shows the different elements of the first embodiment of the articulation 34 between the second bar 3 and the third bar 4 of the first kinematic chain. The pin 341 is rigidaly attached to the third bar 4 while the elastomer element 342 is secured to the second bar 3. With respect to the elastomer element 342 the pin is rotationally guided by the bushings 343, 344 and any axial movement of it is prevented by the washers 345, 346 and by the plate 347. A protective cap 348 covers the pin 341, the washer 345 and the plate 347.

It is to be noted that because of its particular form the elastomer element 342 can be deformed spacially (i.e. not only in a plane) and it thus can act as a toric connection with limited movements between the pin 341 and the second bar 3 of the first kinematic chain.

Figure 4:
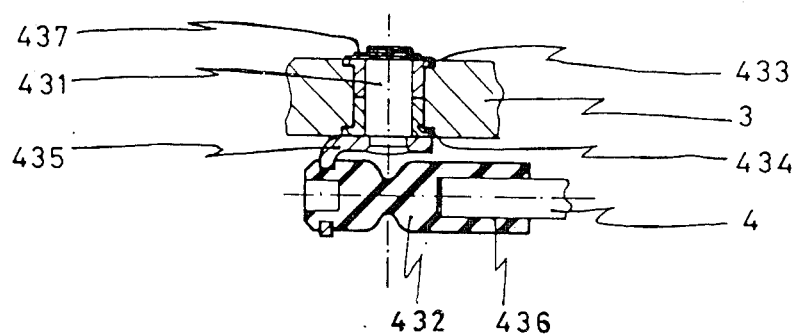
FIG. 4 is a sectional view, on a larger scale, of a second embodiment of the articulation between the second and the third bar of the wiper system according to the invention.

FIG. 4 shows a second embodiment of the articulation between the second bar 3 and the third bar 4 of the first kinematic chain. Said articulation comprises an element of revolution 432 made of an elastomer and secured to the extremity 436 of the third bar. A pivot pin 431 is secured to the elastomer element 432 by means of the elbow shaped part 435. The bushings 433, 434 and the locking plate 437 allow the second bar 3 to rotate about the pivot pin 431. This second embodiment of said articulation is thus a combination of a pivot connection (431) and of a toric connection (432), the two connections being materialized separately.

Figure 5:
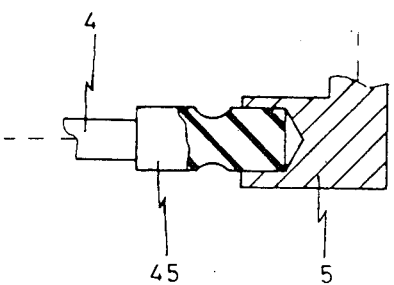
FIG. 5 is a partially sectional view of a first embodiment of the toric connection between the third and the fourth bar of the wiper system according to the invention.

FIG. 5 represents, in its rest position, the joint 45 which links the third bar 4 to the fourth bar 5 according to the first embodiment of the joint. The form of the elastomer material which constitutes the joint is that of an element of revolution provided with a torically shaped recess. The two extremities of the joint are respectively either cemented (glued) onto or into the two end portions of said two bars, 4, 5.

Figure 6:
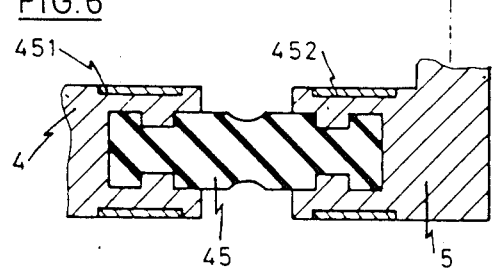
FIG. 6 and FIG. 7 are respectively a sectional and a partially sectional view of a second embodiment of the toric connection between the third and the fourth bar of the wiper system according to the invention.
Figure 8:
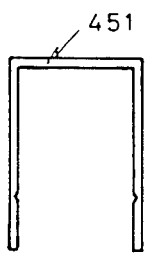
FIG. 8 is an elevational view of a particular element of the toric connection of FIG. 6 and FIG. 7.
Figure 7:
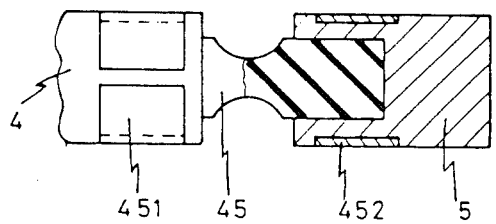

FIG. 6 and FIG. 7 represent, in its rest position, the joint 45 which links the third bar 4 to the fourth bar 5 according to the second embodiment of the joint. The form of the elastomer material which constitutes the joint is that of a prismatic element of which the transverse section is locally reduced. The two extremities of the joint are respectively secured inside the two end portions of said two bars 4, 5 by for example the elements 451, 452 of which one is shown, before assembly, in FIG. 8.

Figure 9:
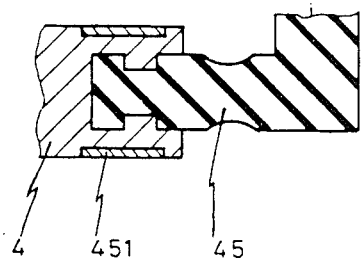
FIG. 9 is a sectional view of a third embodiment of the toric connection between the third and the fourth bar of the wiper system according to the invention.

FIG. 9 represents, in its rest position, the joint 45 which links the third bar 4 to the fourth bar 5 according to the third embodiment of the joint. The form of the elastomer material which constitutes the joint is that of an elbow shaped element of which the transverse section is locally reduced.

I claim:

1. A wiper system for motor vehicles or the like, comprising at least one wiper arm guided and actuated in a complex movement by a first kinematic chain of one degree of liberty, said first kinematic chain comprising an element (1) to be fixed to a motor vehicle, a motor (63), a first bar (2) pivotally connected to the fixed element (1) and actuated in a oscillating movement by the motor (63) and by a second kinematic chain (60, 61, 64, 65), said first kinematic chain further comprising a second bar (3) pivotally connected (23) to the first bar (2) and rigidly connected to the wiper arm, characterized in that the first kinematic chain further comprises a third bar (4) with spaced ends, means (34) for articulating one of the spaced ends of the third bar (4) to the second bar (3), a fourth bar (5), means (51) for rigidly attaching the fourth bar (5) to the element to be fixed to a motor vehicle, toric connection means (45) rigidly connected to the other of the spaced ends of the third bar (4) for rigidly connecting the other of the spaced ends of the third bar (4) to the fourth bar (5).

2. A wiper system according to claim 1, characterized in that the articulation (34) between the second bar (3) and the third bar (4) comprises a combination of a pivot connection (431) and a toric connection (432).

3. A wiper system according to claim 1, characterized in that the movement of the first kinematic chain is a plane movement and that the articulation between the second bar (3) and the third bar (4) is a pivot connection (34).

4. A wiper system according to claim 1, characterized in that the toric connection means (45) is an element made of an elastomer material.

5. A wiper system according to claim 4, characterized in that in a rest position the toric connection means (45) has the form of an element of revolution provided with a torically shaped recess.

6. A wiper system according to claim 4, characterized in that in a rest position the toric connection means (45) has the form of a prismatic element of which the transverse section is locally reduced.

7. A wiper system according to claim 4, characterized in that in a rest position the toric connection means (45) is elbow shaped and that its transverse section is locally reduced

* * * * *